T. N. OIUM.
MILK PAIL HOLDER.
APPLICATION FILED SEPT. 3, 1908.
922,621.
Patented May 25, 1909.
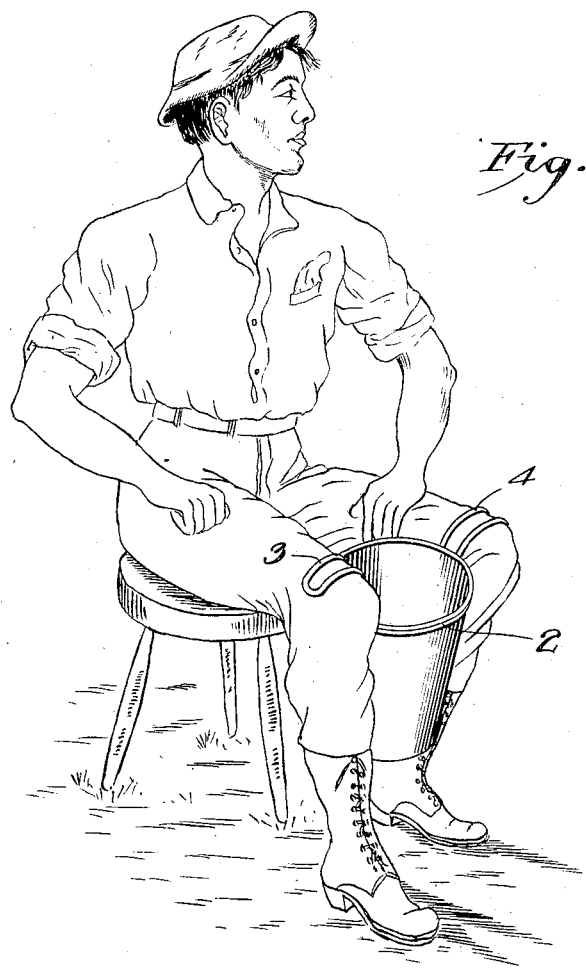
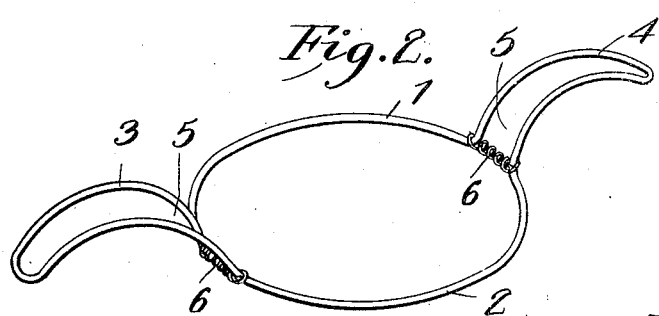
Witnesses
M. S. Rockwell
C. H. Grieshaner
Inventor
T. N. Oium
By H. B. Willson & Co
Attorneys

UNITED STATES PATENT OFFICE.

THOMAS N. OIUM, OF LISBON, NORTH DAKOTA.

MILK-PAIL HOLDER.

No. 922,621.  Specification of Letters Patent.  Patented May 25, 1909.

Application filed September 3, 1908. Serial No. 451,523.

*To all whom it may concern:*

Be it known that I, THOMAS N. OIUM, a citizen of the United States, residing at Lisbon, in the county of Ransom and State of North Dakota, have invented certain new and useful Improvements in Milk-Pail Holders; and I do declare the following to be a full, clear, and exact description of the invention, such as will enable others skilled in the art to which it appertains to make and use the same.

This invention relates to a milk pail holder particularly designed for holding milk pails in a convenient position on the knees of a person during the milking operation.

One of the objects of the invention is the production of a simple device provided with a pail with a supporting portion, and a plurality of arms arranged to rest on the knees of a person in such a manner that a pail may be conveniently supported upon the person's knees without any conscious effort or exertion on the part of the person.

Another object of this invention is the production of a milking pail holder provided with a milk pail supporting portion arranged to loosely grip the sides of a milk pail, and having a plurality of knee engaging arms.

A still further object of this invention is the production of a milk pail holder having its body portion formed of a single piece of material provided with a supporting portion arranged to grip the sides of a milk pail.

With these and other objects in view, the invention consists of certain novel features of construction, combination and arrangement of parts, as will be more fully described and particularly pointed out in the appended claims.

In the accompanying drawings, Figure 1 is a perspective view of my improved milk pail holder applied to a person's knees, and Fig. 2 is a similar view thereof slightly enlarged.

In the drawings the numerals 1 and 2 designate a plurality of pail engaging portions bent in the arc of a circle and connected together by upwardly extending curved arms 3 and 4 which are formed with the portions 1 and 2.

My improved milk pail holder is preferably formed of one piece of wire material by taking a link of wire and bending the middle portion thereof so as to form the portion 1, and bending said wire upwardly so as to form one part of the arms 3 and 4, and bending the wire upon itself so as to complete the formation of the arms 3 and 4 and then bending the ends of said wire in the arc of a circle so as to form the portion 2, and twisting the extremities of said wires together thereby completing the body portion of my holder. The arms 3 and 4 may be twisted from the body portion and are preferably spaced apart at 5, where they connect with the portions 1 and 2, and at these points they are provided with springs 6, which are intertwisted with the arms 3 and 4 and adapted to draw the portions 1 and 2 toward each other so that said portions will resiliently grip the sides of a milk pail.

My improved milk pail holder is applied to a person's knees by placing the curved arms 3 and 4 across the knees so that the portions 1 and 2 will depend from the arms centrally of the knees and then passing the milk pail through the opening embraced by the portions 1 and 2. The portions 1 and 2 will grip the sides of a milk pail and will normally engage the upper rim of the milk pail thereby holding the same upon the knees of a person. By reason of the springs 6 my improved milk pail holder may be connected with any ordinary size milk pail, as the portions 1 and 2 will be expanded apart by a large size pail and be closed in by the springs 6 when a small size pail is inserted between the portions 1 and 2.

My improved milk pail holder will securely support the milk pail in an empty or full condition upon the knees of a person so that said person may devote his energies to the milking operation exclusively. When supported on the knees the person's feet may be moved without danger of spilling the contents of the milk pail. Heretofore it has been the custom to support a milk pail upon a person's legs by placing it between the legs and squeezing the same together, and as the pail would be filled the bottom rim of the pail would become seated on the ankles of the person with consequent discomfiture. With my improved device the milking operation is facilitated and the contents of the milk pail protected against accidental spilling.

From the foregoing description, taken in connection with the accompanying drawings, the construction and operation of the invention will be readily understood without requiring a more extended explanation, Various changes in the form, proportion and the minor details of construction may be resorted to without departing from the principle or sacrificing any of the advantages of this invention as defined in the appended claims.

Having thus described my invention, what I claim and desire to secure by Letters Patent is:—

1. A milk pail support comprising a bucket supporting portion, and a plurality of expansible curved knee arms formed on the supporting portion and extending in opposite directions therefrom.

2. A milk pail support comprising a plurality of pail gripping portions, resilient means for bringing the pail engaging portions toward each other, and a plurality of curved knee engaging arms extending in opposite directions from the pail engaging portions.

3. A milk pail support formed of a single piece of material provided with oppositely bent pail engaging portions, and a plurality of curved knee engaging arms extending in opposite directions therefrom, and means for causing the pail engaging portions to grip the sides of the milk pail.

4. A self-adjusting milk pail support having knee engaging arms extending in opposite directions therefrom.

5. A self-adjusting milk pail support provided with pail gripping portions and expansible knee arms connecting the pail gripping portions.

6. A self-adjusting milk pail support comprising pail gripping portions and resilient means connected with said pail gripping portions for causing the same to automatically grip the sides of a pail.

7. A self-adjusting milk pail support comprising pail gripping portions, expansible knee arms for connecting the pail gripping portions and resilient means connected with the pail gripping portions.

8. A self-adjusting milk pail support provided with pail gripping portions, expansible knee arms for connecting the pail gripping portions and springs connected to the pail gripping portions and adapted to hold said portions toward each other.

In testimony whereof I have hereunto set my hand in presence of two subscribing witnesses.

THOMAS N. OIUM.

Witnesses:
N. BERG,
B. McLAUGHLIN.